Figure 1:
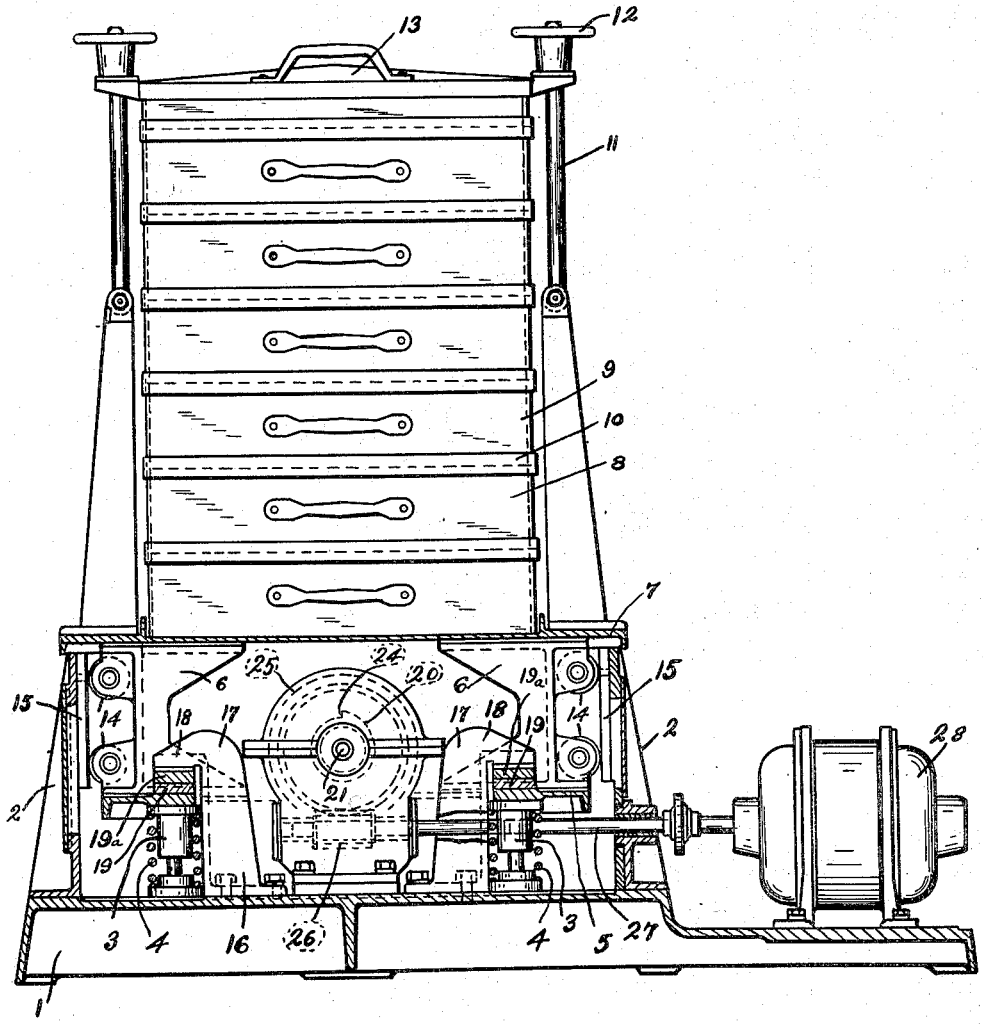

Feb. 12, 1935.   M. P. REYNOLDS ET AL   1,991,001
CLASSIFYING APPARATUS
Filed Jan. 4, 1932   3 Sheets-Sheet 3

INVENTORS.
Morley Punshon Reynolds and
BY Roger W. Disbro

Fay Oberlin & Fay
ATTORNEYS,

Patented Feb. 12, 1935

1,991,001

UNITED STATES PATENT OFFICE 1,991,001

CLASSIFYING APPARATUS

Morley Punshon Reynolds, Cleveland Heights, and Roger W. Disbro, Shaker Heights, Ohio, assignors to The W. S. Tyler Company, Cleveland, Ohio, a corporation of Ohio Application January 4, 1932, Serial No. 584,604

2 Claims. (Cl. 209—237)

This invention relating as indicated to classifying apparatus has particular reference to an apparatus such as is commonly employed for the purpose of testing materials to classify the same according to size.

As is well known to those familiar with the art, screening apparatus as employed on a commercial basis is not usually required to produce results which are absolutely accurate. That is to say, the work performed by commercial screening apparatus is usually only roughly accurate for the reason that to operate screening apparatus on a commercial basis to an absolute degree of accuracy would be impractical. However, for scientific purposes and also for the purpose of determining accurately the type of material which is to be dealt with in commercial practices, it is essential that some apparatus be employed which will very accurately determine the different sizes of the ingredients making up a particular mass.

It is essential in the design of equipment for the high class work that the same operate quickly and efficiently to produce the desired results.

In order to accurately classify the material as to size, it is necessary that each particle of the material have all of its possible faces presented to the classifying cloth, for the reason that such material is defined by its smallest dimensions.

In order to produce these extremely accurate results for testing purposes which results are not a simulation of field practices, but rather a very fine analysis of the material, it is essential that the particular apparatus employed be able to reproduce identical test conditions regardless of the time when such tests are made or the material being tested.

With a given size of screen employed for the purpose of classifying a given quantity of material, the following conditions have been found to influence the accuracy by which repeated tests may be carried forth: First, the speed of operation of the apparatus; and second, the character of the impulse given to the sieves for the purpose of actuating the same and classifying the material thereon.

The speed at which the apparatus is operated is usually readily controllable by simply a control of the speed of the driving motor. The character of the impulses transmitted to the sieves is fully as important as the speed at which the apparatus is operated and is much more difficult to standardize and control. It is essential that any one apparatus or a group of machines, if designed to be used as a standard for testing, operate in exactly the same way for each and every successive test if any testing standards are to be established. It is one of the objects of our invention to provide an apparatus capable of performing the above-named desired functions. Other objects of our invention will appear as the description proceeds. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 2:
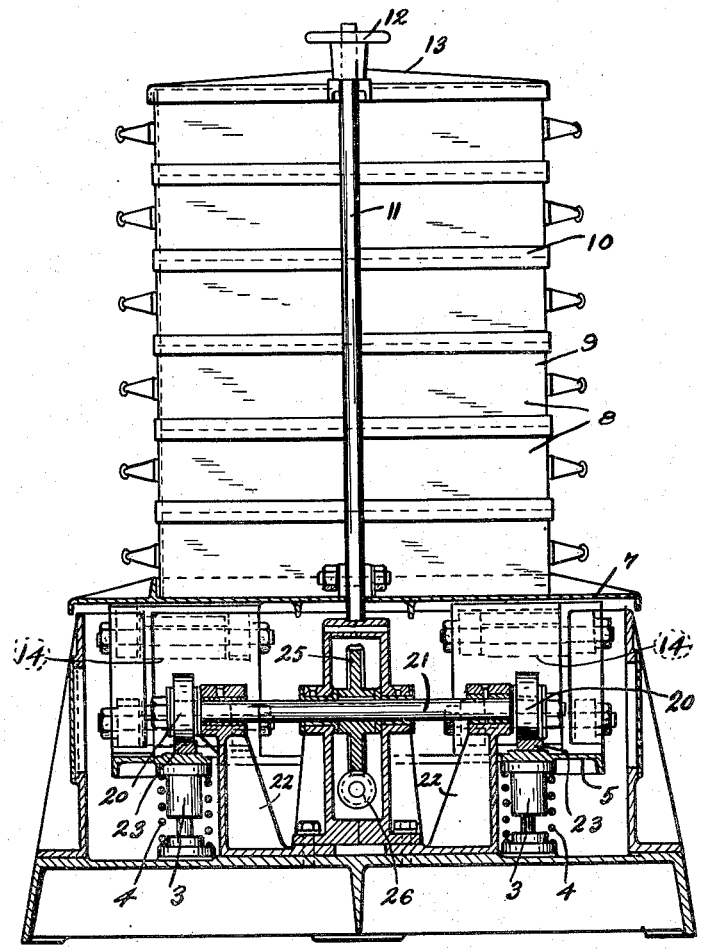
Figure 3:
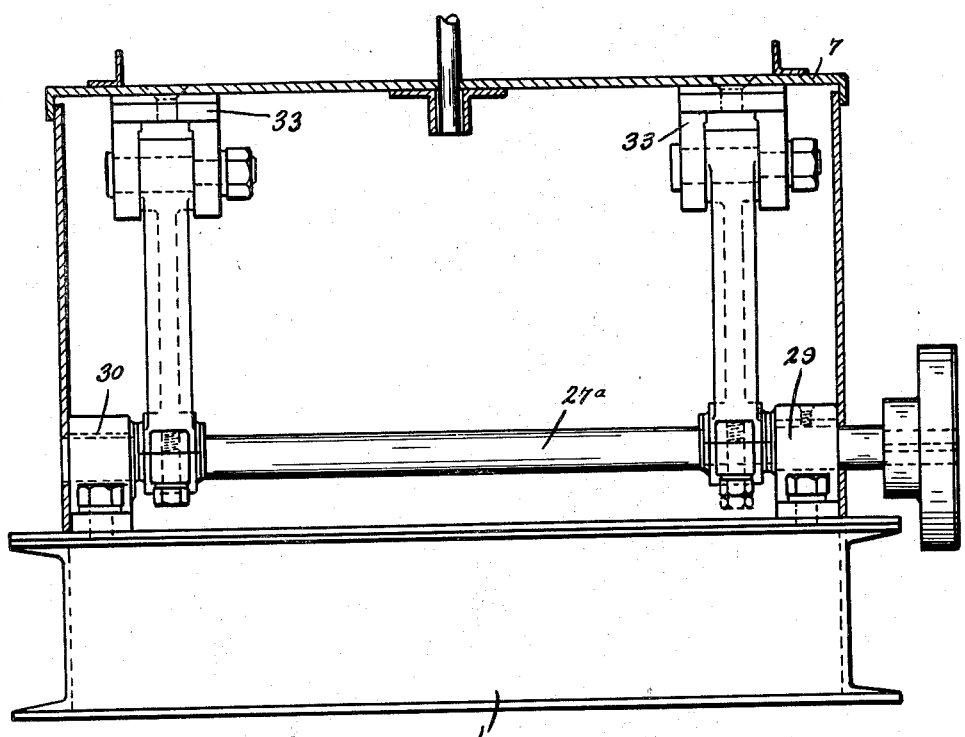
Figure 4:
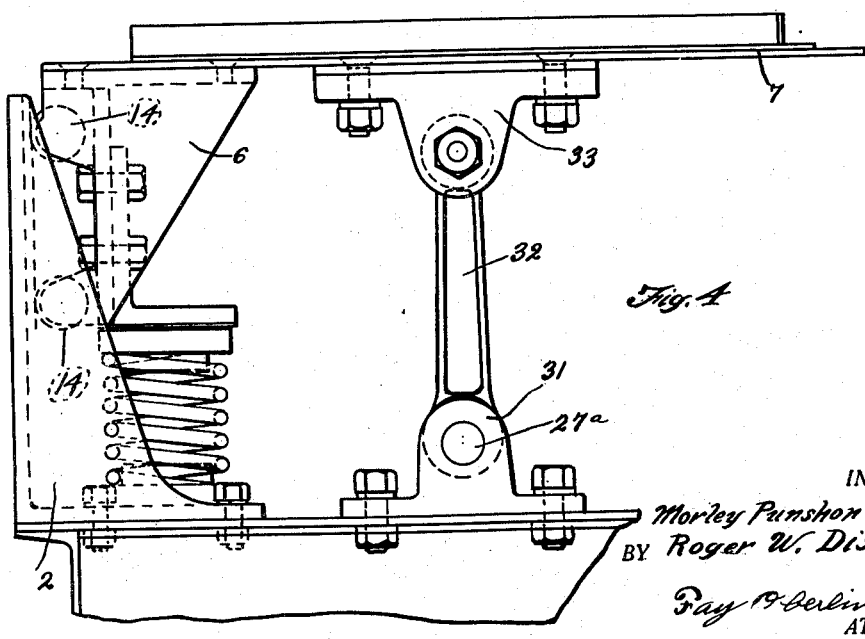

In said annexed drawings:

Fig. 1 is a side elevational view partially in section of one form of the apparatus comprising our invention; Fig. 2 is an elevational view partially in section of the apparatus illustrated in Fig. 1; Fig. 3 is a fragmentary part sectional and part elevational view of an apparatus similar to that illustrated in Figs. 1 and 2 but showing an alternative form of construction; Fig. 4 is a fragmentary transverse sectional view of the apparatus illustrated in Fig. 3.

Referring now more specifically to the drawings and more especially to Figs. 1 and 2, the apparatus therein illustrated consists of a base member 1 which has upwardly projecting housing portions 2 secured thereto. Mounted on the base 1, which may be rectangular in form, are a plurality of spring supported abutment members 3 which are urged upwardly under the influence of compression springs 4. The abutment members 2 which will preferably be four in number and positioned adjacent the respective corners of the rectangular base 1 carry a plate 5 which is likewise preferably rectangular in form and provided with a rectangular aperture. Mounted on the plate 5 are supporting members 6 which on their upper surfaces carry a sieve supporting plate 7. Mounted on the sieve supporting plate 7 are one or more stacked sieves 8 which usually comprise an annular frame 9 having a screen cloth stretched across the bottom and along the upper edge provided with an annular flange 10 adapted to receive the bottom of the next vertically adjacent sieve.

The sieves 8 are maintained in assembled relation and secured to the plate 7 by means of studs 11 which, cooperating with hand nuts 12, force the cover plate 13 and accordingly the stacked sieves into assembled relation on the plate 7. The studs 11 may be hingedly secured at their lower ends to the plate 7 as illustrated in Fig. 2, or they may be secured to abutments such as are illustrated in Fig. 2.

The above described assembly is supported laterally by means of a plurality of rollers such as 14 adapted to bear on wear plates 15 carried by the sides of the housing 2.

Secured to the base 1 are a plurality of hook-shaped stop members 16 which project upwardly as at 17 through the rectangular aperture provided in the plate 5 and extend laterally as at 18 to engage striking blocks 19 carried by the plate 5. The hooks 18 carry corresponding striking blocks 19a which may be shim-supported for adjustment to compensate for wear. The several parts will be so positioned that the springs 4 will normally urge the plate 5 upwardly so that the striking blocks 19 contact with corresponding blocks carried on the hooks 18 for all loads of material to be tested in the apparatus.

Oscillation of the stacked sieves axially thereof is secured by means of paired cams 20 secured to opposite ends of a shaft 21 which is supported in suitable bearings on posts 22. Secured to the plate 5 immediately underneath the cams 20 are wearing blocks 23 against which the cams operate. The cams 20, as most clearly illustrated in Fig. 1, are substantially involute in contour and have a drop-off portion 24. As the cams are rotated, therefore, the plate 5 will be gradually depressed until the high point 24 moves off from the blocks 23 whereupon the compression springs 4 will move the plates 5 and 7 and the sieves carried thereby upwardly until abruptly arrested by the hooks 18. Repeated rotation of the cams 20 will cause a repetition of the above cycle of operation thereby imparting vibration to the screens which are positively limited in amplitude in both directions. That is to say, the downward movement of each vibration is determined by the eccentricity of the cam 24 and the upward movement will be determined by the height of the hooks 18.

Rotation of the cams 20 is secured by means of a worm gear 25 keyed to the shaft 21 and driven by a worm 26 keyed to an extension 27 of the shaft of the motor 28. In the above described apparatus the amplitude of each vibration imparted to the sieves is always constant for the reasons explained and the rate at which such vibrations occur is dependent upon the speed of rotation of the motor 28 which, of course, may be accurately controlled in any well known manner.

Instead of employing the cam and stop arrangement illustrated in Figs. 1 and 2, we may prefer to employ a pitman and eccentric construction such as is illustrated in Figs. 3 and 4. In these last-named figures only so much of the apparatus relating to the means for effecting vibration of screens has been shown. In these figures, the base 1 has mounted thereon bearings 29 and 30 which rotatably support the shaft 27a. To this shaft are secured eccentrics 31 which are journalled in the lower ends of the pitmen 32. The pitmen 32 are at their upper ends oscillatably secured to brackets 33 secured to the lower surface of the plate 7. The vibration of the sieves in this form of construction is therefore, secured by rotation at a suitable speed of the shaft 27a from a motor such as 28.

When this form of construction is employed, the vibrations imparted to the screens are likewise positively limited in amplitude depending upon the eccentricity of the connection between the pitmen 32 and the shaft 27a and the amount of such amplitude of each vibration is therefore entirely independent of the load on the sieves or the character of the material. By the employment of apparatus such as the above described, a suitable quantity of material may be placed in the apparatus or the top sieve. Due to the fact that the speed of the motor may be accurately controlled and further for the reason that the amplitude of each vibration imparted to the sieves is positively limited and accordingly successive impulses are identical, the results of a definite time interval of operation, either on separate machines or successive runs on the same machine, will be the same.

It has been found from actual tests that the apparatus comprising our invention is particularly applicable for the purpose of classifying relatively large size material. When relatively large size material is introduced to screening apparatus for testing purposes heretofore employed, such material has a dampening effect on the sieves and hence there is not sufficient agitation of the material to present the several faces thereof to the classifying screen as is the case in our construction. Material treated in our apparatus, it has been observed, is bodily lifted from the sieve each time the upper end of a vibration is reached and in being thrown off from the cloth or screen a new face of the material is presented, the next time it drops back into the screen. For this reason and other reasons the apparatus comprising our invention may be employed to more rapidly carry on the classifying of material with the accuracy required for testing purposes.

Other modes of applying the principle of our invention may be employed instead of the one explained, change being made as regards the mechanism, herein disclosed, provided the means stated by any of the following claims or the equivalent of such stated means be employed.

We therefore particularly point out and distinctly claim as our invention.

1. In laboratory sieve shaker, the combination with means for supporting a plurality of stacked horizontal sieves, of means for imparting vibration thereto axially of said sieves, said means comprising a rotatable shaft having an eccentric thereon, a pitman connecting said eccentric and sieve supporting means, and wheels rotatably mounted on said sieve supporting means for guiding the vertical movement of said supporting means.

2. In an apparatus of the character described, the combination of a fixed frame, a vertically movable base member positioned in said frame, a plurality of stacked horizontal sieves carried by said base member, vertical bars mounted on said frame and attached to the uppermost of said stacked sieves, resilient means adapted to urge said base member upwardly, rotatable cam means for intermittently moving said base member downwardly against said resilient means, means for adjusting the length of said vertical bars, and wheel means contacting said frame and carried by said base member for guiding the movement of the latter.

MORLEY PUNSHON REYNOLDS.
ROGER W. DISBRO.